(12) United States Patent
Verma

(10) Patent No.: US 12,242,836 B2
(45) Date of Patent: Mar. 4, 2025

(54) MULTI-MODE SUPPORT FOR A LAUNCHER

(71) Applicant: Omnissa, LLC, Mountain View, CA (US)

(72) Inventor: Gaurav Verma, Bangalore (IN)

(73) Assignee: Omnissa, LLC, Mountain View, CA (US)

(*) Notice: Subject to any disclaimer, the term of this patent is extended or adjusted under 35 U.S.C. 154(b) by 135 days.

(21) Appl. No.: 17/836,387

(22) Filed: Jun. 9, 2022

(65) Prior Publication Data

US 2023/0401049 A1 Dec. 14, 2023

(51) Int. Cl.
*G06F 8/61* (2018.01)
*G06F 3/0482* (2013.01)
*G06F 3/0484* (2022.01)

(52) U.S. Cl.
CPC .............. *G06F 8/62* (2013.01); *G06F 3/0482* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 6,578,142 B1* | 6/2003 | Anderson | G06F 8/61 717/170 |
| 8,972,400 B1* | 3/2015 | Kapczynski | G06Q 10/10 707/821 |
| 10,643,246 B1* | 5/2020 | Suprasadachandran Pillai | G06Q 30/0269 |
| 2008/0301166 A1* | 12/2008 | Sugiyama | G06Q 30/02 707/999.102 |
| 2015/0332067 A1* | 11/2015 | Gorod | G06F 3/0484 726/26 |
| 2015/0370428 A1* | 12/2015 | Chan | G06F 8/62 715/739 |
| 2016/0139791 A1* | 5/2016 | McConnell | G06Q 10/0639 715/745 |
| 2016/0165097 A1* | 6/2016 | Takenouchi | G06F 3/048 358/1.9 |
| 2017/0185631 A1* | 6/2017 | Huang | G06F 3/04817 |
| 2018/0005276 A1* | 1/2018 | John | G06F 21/6245 |

(Continued)

OTHER PUBLICATIONS

Basu, "Multi-user Adaptive Launcher for Android", 2019, IEEE (Year: 2019).*

(Continued)

*Primary Examiner* — Hossain M Morshed
(74) *Attorney, Agent, or Firm* — Kim & Stewart LLP

(57) ABSTRACT

Systems and methods are described for a launcher on a user device that allow users to choose between multiple launcher modes. In an example, a user can log in to a management application on a user device that manages the user device. The management application can send the credentials to a server. The server can verify the credentials and send a launcher profile associated with the user to the management application. The management application can check the launcher profile to determine whether the user is allowed to choose a launcher mode. If so, the management application can display the available launcher modes on the user device. The user can select a launcher mode, and the management application can configure the launcher with settings corresponding to the selected mode.

20 Claims, 4 Drawing Sheets

(56) References Cited

U.S. PATENT DOCUMENTS

| | | | |
|---|---|---|---|
| 2018/0181901 A1* | 6/2018 | Babcock | G06F 3/0484 |
| 2019/0149405 A1* | 5/2019 | Verma | H04L 41/0894 |
| | | | 709/222 |
| 2019/0163333 A1* | 5/2019 | Kogan | G06F 3/0482 |
| 2020/0028960 A1* | 1/2020 | Verma | H04M 1/72463 |
| 2020/0220903 A1* | 7/2020 | Verma | G06F 21/51 |
| 2023/0112606 A1* | 4/2023 | Verma | G06K 19/06037 |
| | | | 726/6 |
| 2023/0401049 A1* | 12/2023 | Verma | G06F 9/44505 |

OTHER PUBLICATIONS

Ocano, "Remote Mobile Screen (RMS): an approach for secure BYOD environments", 2015, IEEE (Year: 2015).*

* cited by examiner

MULTI-MODE SUPPORT FOR A LAUNCHER

BACKGROUND

Many enterprises and other organizations implement Unified Endpoint Management ("UEM") systems or other similar systems for managing user devices. User devices are enrolled in the UEM system and then managed using a management application installed on the user device. In addition to management applications, launchers offer further control of user devices. A launcher is an application that modifies the design and features of an operating system ("OS") running on a user device. A launcher can allow an organization to restrict the use of a user device to a defined manner. For example, a launcher can restrict use of a user device to single application or a designated set of applications.

Launchers currently implemented in UEM systems have limitations that make their use burdensome in certain situations. For example, launchers can be implemented in multiple modes, such as a mode that allows access to a single application, a mode that allows access to multiple applications, and a mode that is based on a template. However, a user's profile can only be associated with a single mode. For a user to have access to multiple launcher modes, the user must either have a separate user device or a separate user profile for each mode. An administrator cannot change the launcher mode for a user without manually modifying the user's profile and pushing the updated profile to the user device.

Having access to multiple launcher modes is necessary for some employees of an organization. For example, some users have multiple roles, and each role requires access to a different launcher mode. Currently, there is no existing solution that allows such a user to access multiple launcher modes on a user device.

As a result, a need exists for providing access to multiple launcher modes for the same profile on a user device.

SUMMARY

Examples described herein include systems and methods for providing multiple modes in a launcher. As described herein, a launcher can be any application that modifies the design and features of an OS running on a user device. A launcher can allow an organization to restrict the use of a user device to a defined manner. For example, a launcher can restrict access to a single application or designated set of applications.

The launcher can be configured by a management application installed on the user device. The management application can communicate with a management server in a UEM system, or other similar device management system, to allow UEM management of the user device. Part of managing user devices can include installing launcher profiles on user devices that are configured with a launcher. A launcher profile can include launcher settings and permissions for a user accessing a user device with a launcher. For example, a launcher profile can designate a launcher mode, applications to be available in the launcher, colors schemes, and so on.

A launcher mode can be a configuration in which a launcher operates. For example, a Single App mode can allow a single designated application to run in the foreground while restricting access to the rest of the user device. A Multi-App mode can allow access to multiple designated applications while restricting access to the rest of the user device. A Template mode can be a mode created from a template. For example, images, text, applications, and access permissions can be customized in a Template mode.

When a user logs in to a user device with a launcher, the management application on the user device can request a launcher profile associated with the user from a management server. The management server, after verifying the credentials, can send the user's launcher profile to the management application. The management application can then configure the launcher according to the user's launcher profile. For example, if the launcher profile designates a single application in a Single App launcher mode, then the management application can configure the launcher in the Single App mode with the single application running in the foreground. If the launcher profile designates a set of applications in a Multi App mode, then the management application can configure the launcher in the Multi App mode with the set of applications available for the user to choose from.

The launcher described herein has the capability of letting a user choose a launcher mode and switch between launcher modes. For example, the launcher profile can indicate whether a user can choose a launcher mode. If not, then the management application can configure the launcher in the designated mode. If the user is allowed to choose, then the management application can display the available launcher modes on the user device so that the user can choose which one to use. The management application can retain the settings of each available launcher mode on the user device, such as in the user device's memory. When the user selects a launcher mode, then the management application can install the settings corresponding to that launcher mode.

The remaining launcher mode settings can remain in the user device's memory while the user is logged in. The launcher can be configured with an option to switch launcher modes. If the user selects this option, the launcher can present the other launcher modes available to the user as designated by the launcher profile. If the user selects one of these launcher modes, then the management application can uninstall the settings for the current launcher mode and install the settings for the new launcher mode from the memory. The original launcher mode settings can remain in the user device's memory for use if the user decides to switch back to the original launcher mode.

In some instances, a user device can be assigned a launcher mode so that any user that accesses the user device is restricted to the assigned launcher mode. The launcher described herein can also be configured to allow an administrator ("admin") to remotely change launcher modes at the user device without pushing a new launcher profile. For example, an admin interface can be provided that allows an admin to make such changes. For example, the admin interface can allow an admin to select a user device, or group of user devices assigned to the same group, and modify the launcher profile of that user device (or group of user devices). As an example, the admin can change a launcher from Single App mode to Multi App, change which application is available in Single App mode or applications in Multi App mode, add additional launcher modes, or configure the launcher so that any user that logs in can select a launcher mode to use. The UEM system can apply the changes made by the admin without the need to push new launcher profiles out. For example, the UEM system can push new launcher mode settings or application files to the user devices.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for a launcher on a user device that allow users to choose between multiple launcher modes. In an example, a user can log in to a management application on a user device that manages the user device. The management application can send credentials to a server. The server can verify the credentials and send a launcher profile associated with the user to the management application. The management application can check the launcher profile to determine whether the user is allowed to choose a launcher mode. If so, the management application can display the available launcher modes on the user device. The user can select a launcher mode, and the management application can install settings from the launcher profile corresponding to the selected mode. Settings for the remaining launcher modes can be retained on the user device. If the user chooses to change launcher modes, then the management application can uninstall the settings for the first launcher mode and install the settings for the newly selected launcher mode.

An admin interface can be provided that allows an admin user to modify launcher settings at user devices and in launcher profiles without pushing new launcher profiles. For example, the admin interface can allow an admin to toggle whether a user can choose a launcher mode or is restricted to an assigned mode. An admin can also add, remove, or modify launcher modes available on a user device or to a user. The modifications can be applied to user devices and existing launcher profiles.

Figure 1:
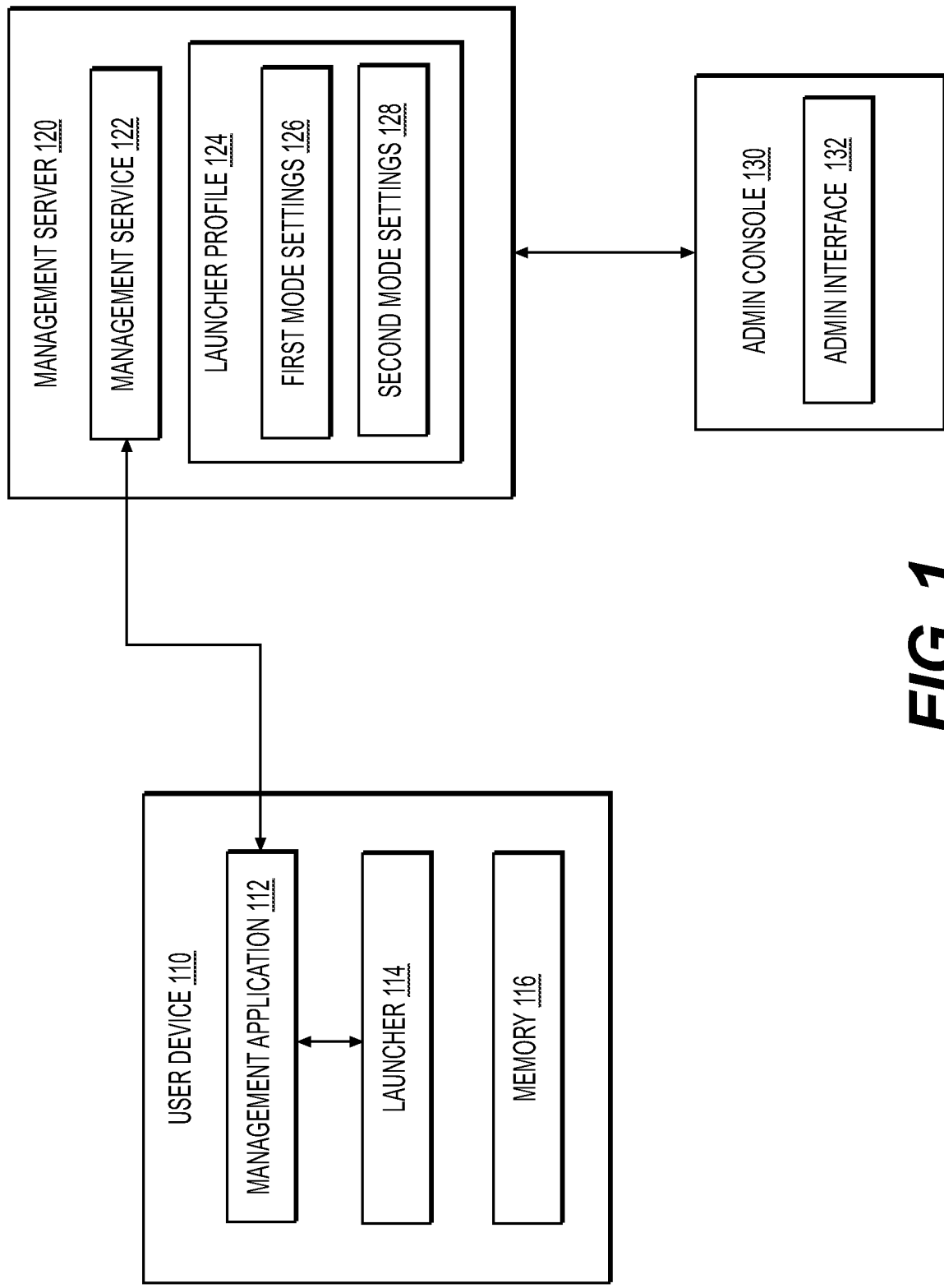
FIG. 1 is an illustration of an example system for providing multiple modes in a launcher.

FIG. 1 is an illustration of an example system for providing multiple modes for a launcher. The system can include a user device 110 that is enrolled in a system for managing a group of user devices, such as a UEM system. The user device 110 can be one or more processor-based devices, such as a personal computer, tablet, or cell phone. A management server 120 can be responsible for managing user devices enrolled in the UEM system. The management server 120 can be a single server or a group of servers, including multiple servers implemented virtually across multiple computing platforms. A management service 122 on the management server 120 can manage enrolled user devices 110 by sending management instructions to a management application 112 installed on the user devices 110. The management application 112 can be a stand-alone application, part of an enterprise application, or part of an operating system ("OS") of the enrolled devices 110.

The management application 112 can be downloaded and installed at the user device 110 prior to, or as part of, the enrollment process. For example, a user can download the management application 112 using a URL that points to a content delivery server with an installation file for the management application 112. The URL can be provided by the enterprise, for example. Alternatively, the user can download the management application 112 from an app store, such as APPLE's APP STORE or GOOGLE PLAY. When the user launches the management application 112 for the first time, the management application 112 can prompt the user to enter authentication credentials, such as a username and password or a one-time password ("OTP") provided to the user by the enterprise. The management application 112 can send the user-provided credentials to the management server 120 in an encrypted format.

If the management server 120 can authenticate the credentials, then the management server 120 can begin provisioning the user device 110 for enterprise management. For example, the management server 130 can send a management profile to the management application 112. The management profile can include compliance and security settings assigned to the user's profile and any user groups that the user is assigned to. The management server 120 can also send a security certificate associated with the user's profile that can be used at the user device 110 to access enterprise data and resources, including managed applications. A managed application can be an application that allows control of access and functionality by the UEM system. The management server 120 can provision managed applications assigned to the user or the management profile. For example, the management service server 120 can provide the management application 112 with installation files or URLs for retrieving the installation files for managed applications.

The management application 112 can configure the user device 110 using the management profile. For example, the management application 112 can install compliance and security settings from the management profile. As an example, the management application 112 can encrypt all or a portion of the user device's hard drive, apply virtual private network ("VPN") settings for accessing UEM data and resources, and set device access controls (e.g., password or personal identification number ("PIN") requirements). The management application 112 can also install and configure managed applications for the user device 110.

After enrollment is complete, the UEM system can actively manage the user device 110 by sending, via the management server 130 or another server in the UEM system, management commands, including any updated compliance and security settings, to the management application 112. The management application 112 can ensure that the user device 110 is up to date with the compliance and security settings prior to allowing access to enterprise data and resources. For example, the management application 112 can analyze the device state of the user device 110 using rules included in the management profile. The device state can include various aspects of the user device 110, such as the device 110 manufacturer, model, and ID, a current battery charge level, whether the user device 110 is jailbroken, OS type and version, geographic location, a login status of the user, and an identification of the applications installed on the user device 110. The user device 110 can provide periodic updates of its state information to the management server 120. These updates can provide a full list of the various device aspects in one example, but in another example each update can identify changes from the previous device status update.

The management server 120 can send management commands to the management application 112 using any available communication protocol or channel. For example, the management server 120 can send management commands using an application programming interface ("API"), a notification system, a messaging system native to the user device 110, or a command queue. In one example using a command queue, the management server 120 can store one or more commands in a queue that is available to the user device 110 over a network. The commands can encompass any management action, such as instructing the device 110 to download an application, report a device state, or apply a new profile. The management system can alert the user device 110 to a change in the command queue, such as by sending a notification to the user device 110 instructing the device to access the command queue. The notification can be sent through the management application 112 in some examples, but can also be sent as an OS-level notification or a message that utilizing an OS messaging scheme, such as a Short Message Service ("SMS") message.

The management application 112 can control access and use of the user device 110 with a launcher 114. The launcher 114 can be an application that modifies the design and features of the OS running on the user device 110. For example, the launcher 114 can replace the stock OS interface for organizing a home screen and application icons. Some examples of launchers include AVIATE, EVERYTHINGME, and NOVA LAUNCHER. An organization can assign a launcher profile 124 to users for accessing user devices that utilize the launcher 114. A launcher profile 124 can include launcher settings and permissions for a user when accessing the user device 110. For example, the launcher profile 124 can designate what applications and other UEM resources the user can access on the user device 110.

The launcher 114 can have different launcher modes, and the launcher profile 124 can designate a mode assigned to the user. One example of such a launcher 114 is WORKSPACE ONE LAUNCHER by VMWARE. A launcher mode can be a configuration in which the launcher 114 operates. For example, a Single App mode can allow a single designated application to run in the foreground and the rest of the user device 110 can be inaccessible to the user. A Multi-App mode can allow multiple whitelisted or designated applications while restricting operations outside of those applications. A Template mode can be a mode created from a template. For example, an admin can choose images, text, and applications in the launcher 114. The admin can also provide instructions on how the user device 110 should be used and customize the design, such as by setting colors or adding a logo. The admin can also designate which applications should be accessible.

An admin can configure a template mode and assign launcher modes to users through an admin interface 132. The admin interface 132 can be any interface that allows an admin to manage user accounts and configuration settings for an organization. The admin interface 132 can be accessed using an admin console 130, which can be any user device, such as a computer, tablet, or phone, that displays the admin interface 132 and is in communication with the management server 120.

The admin interface 132 can allow an admin to make multiple modes available to a user. This can allow a user to change modes on the user device 110 without the need for an admin to push the new mode to the user device 110. For example, an admin can configure a user's launcher profile 124 to allow one or multiple modes. If a launcher profile 124 only allows for one mode, then, when the user logs in, the management application 112 can configure the launcher 114 in the designated mode. On the other hand, if a launcher profile 124 allows the user to choose a launcher mode, then the management application 112 can display launcher mode options in a GUI on the user device 110. When the user selects a mode, the management application 112 can install the settings for selected launcher mode.

A user's launcher profile 124 can include settings for the launcher modes assigned to the launcher profile 124. For example, if the launcher profile 124 is assigned a first and a second launcher mode, then the launcher profile 124 can include first mode settings 126 and second mode settings 128 for the first and second launcher modes, respectively. When a user logs in, the management service 122 can send the launcher profile 124, including the first and second mode settings 126, 128 to the management application 112. The management service 122 can send the launcher profile 124 as one or more data files, such as a JavaScript Object Notation ("JSON") file or Extensible Markup Language ("XML") file. The management service 122 can send the data file using any kind of transmission protocol, such as a Hypertext Transfer Protocol ("HTTP") call or an API call. The management application 112 can save the first and second mode settings 126, 128 in memory 116 of the user device 110. The memory 116 can be any storage component of the user device 110, such as non-volatile random-access memory ("RAM"). After a user selects a launcher mode, the management application 112 can install the corresponding settings.

The launcher 114 can also allow a user to switch modes while using the user device 110. For example, after launching in a first launcher mode, the launcher 114 can include an option for selecting a second available launcher mode. If the user does this, the management application 112 can uninstall the first mode settings 126 and install the second mode settings 128 from memory. The launcher 114 can then operate using the second mode settings 128.

Figure 2:
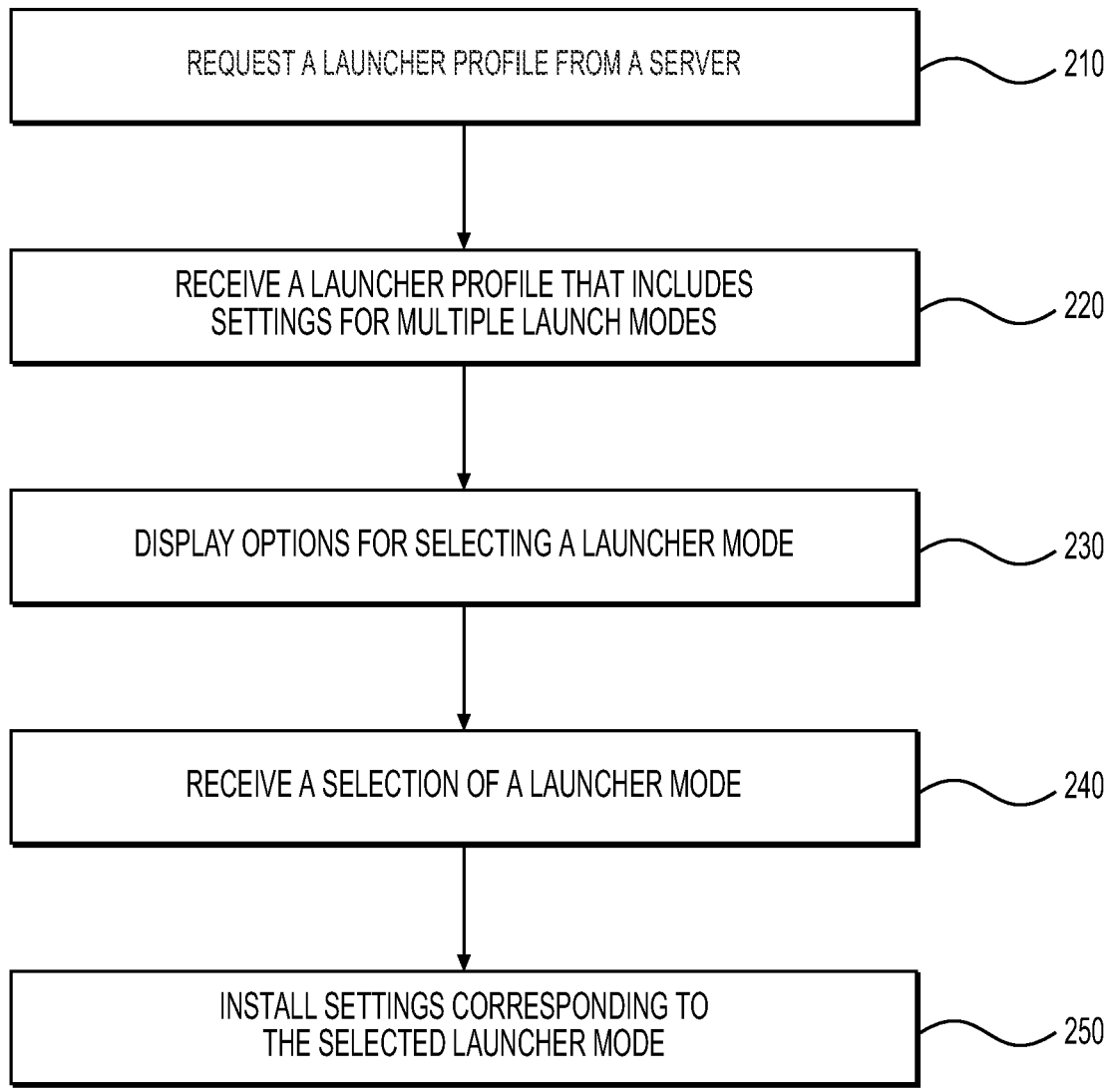
FIG. 2 is a flowchart of an example method for providing multiple modes in a launcher.

FIG. 2 is a flowchart of an example method for providing multiple modes in a launcher. At stage 210, the management application 112 can request the launcher profile 124 from the management server 120. For example, the user device 110 can be a multi-user device that is not assigned to a particular user. Users can log in to the user device 110 through the management application 112, and the management application 112 can configure the launcher 114 according to the user's launcher profile 124. The management application 112 can request the launcher profile 124 in response to a user login attempt. For example, the management application 112 can display a login screen on the user device 110. When a user enters login credentials, the management application 112 can send the login credentials to the management server 120. The login credentials can include an identifier ("ID") that identifies the user's profile, such as a username or user ID.

At stage 220, the management application 112 can receive the launcher profile 124 from the management server 120. For example, the management service 122 can authenticate the credentials sent by the management application 112. If authentication is successful, the management service 122 can locate the user's launcher profile 124 using the credentials. The management service 122 can then send the user's launcher profile 124 to the management application 112.

The launcher profile 124 can designate whether the user is restricted to one launcher mode or can select a launcher mode. The launcher profile 124 can include the launcher mode settings of any launcher modes that the user is authorized to use on the user device 110. For example, if the user is only authorized to use the user device 110 with a first launcher mode, then the launcher profile 124 can include the first mode settings 126. On the other hand, if the user is authorized to use a first or second launcher mode, then the launcher profiler 124 can include the first and second mode settings 126, 128. The launcher profile 124 can also include the launcher mode settings of any additional launcher modes that the user is authorized to use.

At stage 230, the management application 112 can display options for selecting a launcher mode. For example, the launcher mode options can be displayed in a GUI as selection mechanisms, such as buttons. Although this stage is described as being performed by the management application 112, it can alternatively be performed by the launcher 114. For example, the management application 112 can install the launcher profile 124 without installing a launcher mode. This can include configuring the launcher 114 to present the launcher mode options in a GUI.

At stage 240, the management application 112 can receive a selection of a launcher mode. For example, the user can simply select the desired launcher mode. If the launcher 114 present the launcher mode options at stage 230, then the launcher 114 can receive the selection and inform the management application 112.

At stage 250, the management application 112 can install settings for the selected launcher mode on the user device 110. For example, if the user selects a first launcher mode, then the management application 112 can install the first mode settings 126, and if the user selects the second launcher mode, then the management application 112 can install the second mode settings 128. Installing settings can include configuring which applications are accessible in the launcher 114. Once the settings are installed, the launcher 114 can initiate in the selected launcher mode.

The launcher 114 can have an option for switching launcher modes. For example, while using the user device 110 in a first launcher mode, the user can choose to switch to a second launcher mode. When this happens, the management application 112 can uninstall the first mode settings 126 and install the second mode settings 128. In one example, the second mode settings 128, and the settings for any other launcher modes available to the user, can be retained in the memory 116 on the user device 110. This can expedite launcher mode changes because the management application 112 does not have to retrieve the second mode settings 128.

Although the launcher profile 124 is described above as being specific to a user, the launcher profile 124 can also be specific to the user device 110. For example, the user device 110 can be configured with a launcher profile 124 that either allows or restricts launcher mode selection. Using the admin interface 132, an admin can modify properties of the launcher profile 124 without needing to push an entirely new profile to the user device 110. For example, the admin can change the launcher 114 from Single App mode to Multi App, change which application is available in Single App mode or applications in Multi App mode, add additional launcher modes, or configure the launcher 144 so that any user that logs in can select a launcher mode to use. The management server 120 can apply the changes made by the admin without the need to push new launcher profiles 124 out. For example, the management server 120 can apply new launcher mode settings or application files to the user devices.

In some examples, the launcher profile 124 can be dependent on the user and the user device 110. For example, a first launcher profile 124 specific to the user device 110 can be installed on the user device 110. The first launcher profile 124 can include launcher mode settings for launcher modes that can be used on the user device 110. When a user logs in, the management application 112 can retrieve a second launcher profile specific to the user. The user launcher profile can indicate whether the user can choose a launcher mode. If so, the user launcher profile can designate which launcher modes the user is allowed to use. The user can then be presented with the allowed launcher mode options, and any other launcher modes in the device launcher profile can be hidden from the user. An admin can use the admin interface 132 to change whether a user can select a launcher mode, which launcher modes a user can access, and which launcher modes to retain on the user device 110.

Using the admin interface 132, an admin can simultaneously modify launcher settings of multiple user devices or users. For example, users and user devices can be assigned to groups within an organization, and the admin can select a group in the admin interface 132 when modifying launcher mode settings. As an example, a restaurant chain uses user devices 110 for facilitating customers paying for their meals. The user devices 110 are configured with the launcher 112 in a Single App mode that includes a payment application that patrons can use for providing payment. To expand the use of the user devices 110, the restaurant chain decides to use a second application on the user devices 110 that allows employees to view table assignments for waiters. Instead of having to manually reconfigure the devices, an admin user can use the admin interface 132 to reconfigure the user devices 110 so that employees can switch between modes. For example, the user devices 110 can be reconfigured with two different Single App modes, one with the payment application and another with the waiter assignment application. The user devices 110 can be given to patrons in the payment application Single App mode so that they can pay without accessing any other part of the user devices 110, but the employees can have access to switch launcher modes to the Single App mode with the waiter assignment application.

Figure 3:
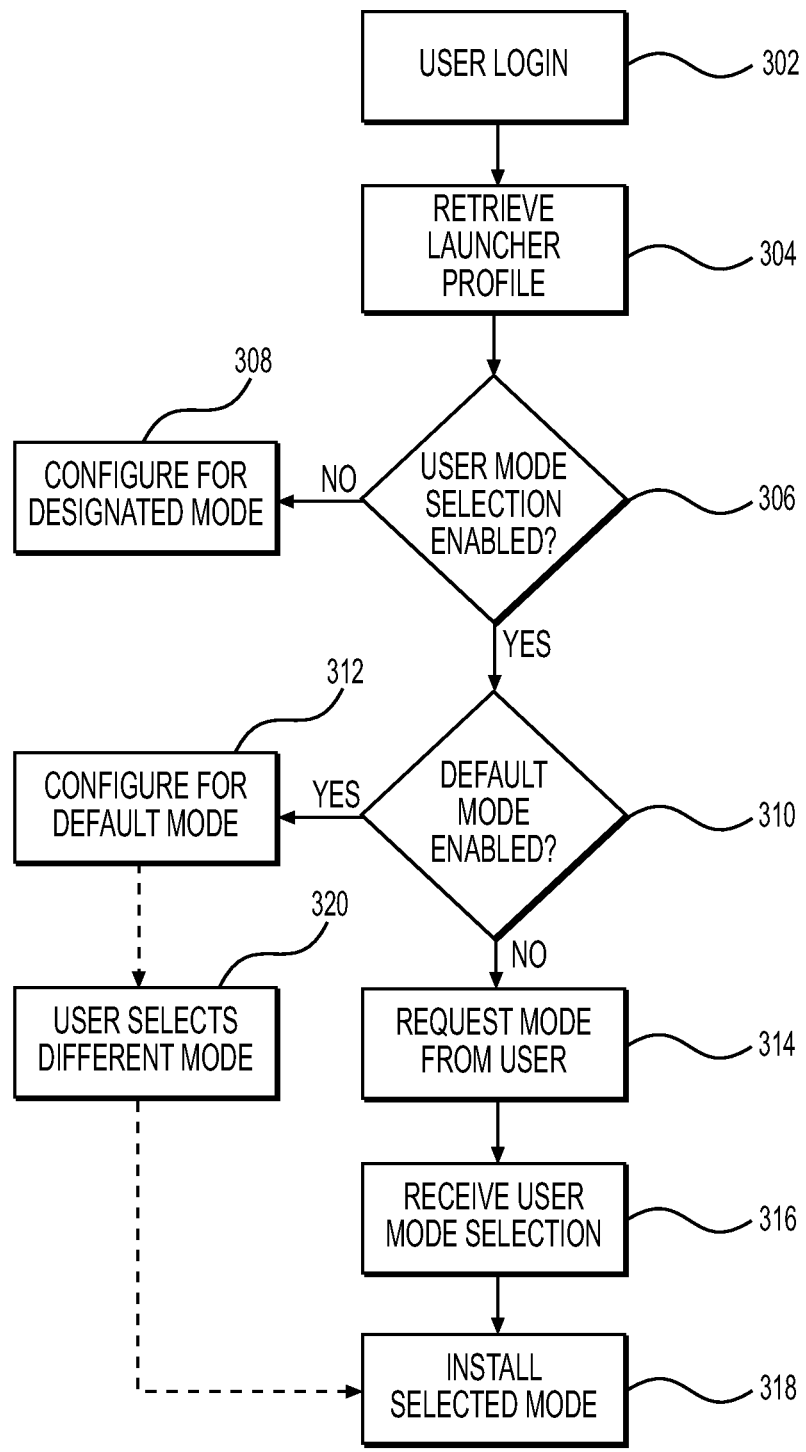
FIG. 3 is another flowchart of an example method for providing multiple modes in a launcher.

FIG. 3 is a flowchart of example logic of the management application 112 when a user logs in to a user device 110 configured with a launcher 114. At stage 302, a user can log in to the management application 112. For example, the user can boot up the user device 110 or turn the user device's display on when no one is logged in. When this happens, the management application 112 can display a login prompt, and the user can input login credentials, such as a username and password.

At stage 304, the management application 112 can retrieve the user's launcher profile 124. For example, the management application 112 can send the login credentials to the management server 120 where the credentials can be verified. If the credential verification fails, the user can be notified to reenter the log credentials. If the credential verification is successful, the management service 122 can retrieve the launcher profile 124 for the user. For example, launcher profiles 124 can be retained in a database, and the management service 122 can retrieve the launcher profile 124 associated with the login credentials and send that launcher profile 124 to the management application 112.

At stage 306, the management application 112 can determine whether the user can choose a launcher mode. For example, the launcher profile 124 can include a "user option" property that designates whether the user can choose a launcher mode. The management application 112 can check the user option property before installing any launcher mode settings.

If the user option property indicates that the user cannot choose a launcher mode, then the process can proceed to stage 308 where the management application 112 can configure the launcher for a designated mode. In one example, the launcher profile 124 can include a "designated mode" property that designates a launcher mode when the user is not permitted to choose. The management application 112 can install the settings of the designated launcher mode as indicated in the designated mode property. Alternatively, because only one mode is accessible to the user, the launcher profile 124 may only include settings for one launcher mode. If so, when the user option property indicates that the user cannot choose a launcher mode, the management application 112 can be configured to simply install the launcher mode settings included in the launcher profile 124.

If the user option property does indicate that the user can choose a launcher mode, then, at stage 310 the management application 112 can determine whether the user has a default launcher mode enabled. For example, the launcher profile 124 can include a "default launcher mode" property that, when enabled, causes the management application 112 to install the launcher mode settings of a default launcher mode. The default launcher mode can also be identified in the launcher profile 124. The management application 112 can install the launcher mode settings for the default launcher mode at stage 312. The management application 112 can also save the launcher mode settings of the other available launcher modes in the user device's memory 116.

The default launcher mode can be set by the user or an admin. For example, if the user typically uses a first launcher mode when using the user device 110, then the user can designate the first launcher mode as the default mode. The default launcher mode can also be determined based on the launcher mode that user most often uses. For example, if a certain user logs into the user device 110 and initiates a certain Single App mode more frequently than any other available mode, then the management application 112 can automatically configure the launcher 114 for that Single App mode when the user logs in. The user can then have the option to choose a different mode. The default mode designation can be saved to the user's launcher profile 124 so that the management application 112 automatically configures the launcher 114 in the first launcher mode when the user logs in to the user device 110. The user can then have the option to change launcher modes. As an example, if the first launcher mode is set as the default for the user, when the user logs in to the user device 110, the management application 112 can install the first mode settings 126 and save the second mode settings 128 in the memory 116. If the user chooses to change modes at stage 320, then the management application 112 can uninstall the first mode settings 126, save the first mode settings 126 in the memory 116, and then proceed to stage 318 where the management application 112 can install the second mode settings 128 from the memory 116.

If the user does not have a default mode, then the management application 112 can request that the user select a mode at stage 314. For example, the management application 112 can display a list of available launcher modes in a GUI. At stage 316, the user can select one of the available launcher modes. At stage 318, the management application 112 can install the settings for the selected mode. The settings for unselected launcher modes can be retained in the memory 116 and retrieved if the user changes launcher modes.

Although the process above is described as being performed by the management application 112, some of the stages can be performed by the launcher 114. For example, when the user can choose a launcher mode, the management application 112 can provide information about the available launcher modes to the launcher 114, and at stage 314 the launcher can display the launcher mode options in its GUI. At stage 316, the launcher 114 can receive the user's selection and provide the selection to the management application 112. The management application 112 can then install the corresponding launcher mode settings. The launcher 114 can then initiate using the installed settings. The launcher 114 can also receive a user selection for changing modes at stage 320. The launcher 114 can provide the selection to the management application 112, and the management application 112 can install the corresponding settings at stage 318.

In an example, properties of a launcher profile, 124 such as the user option property, designated mode property, and default mode properties described above, can be modified by an admin using the admin interface 132. This can allow an admin to modify a launcher profile 124 without having to push an entirely new profile to the user device 110.

Figure 4:
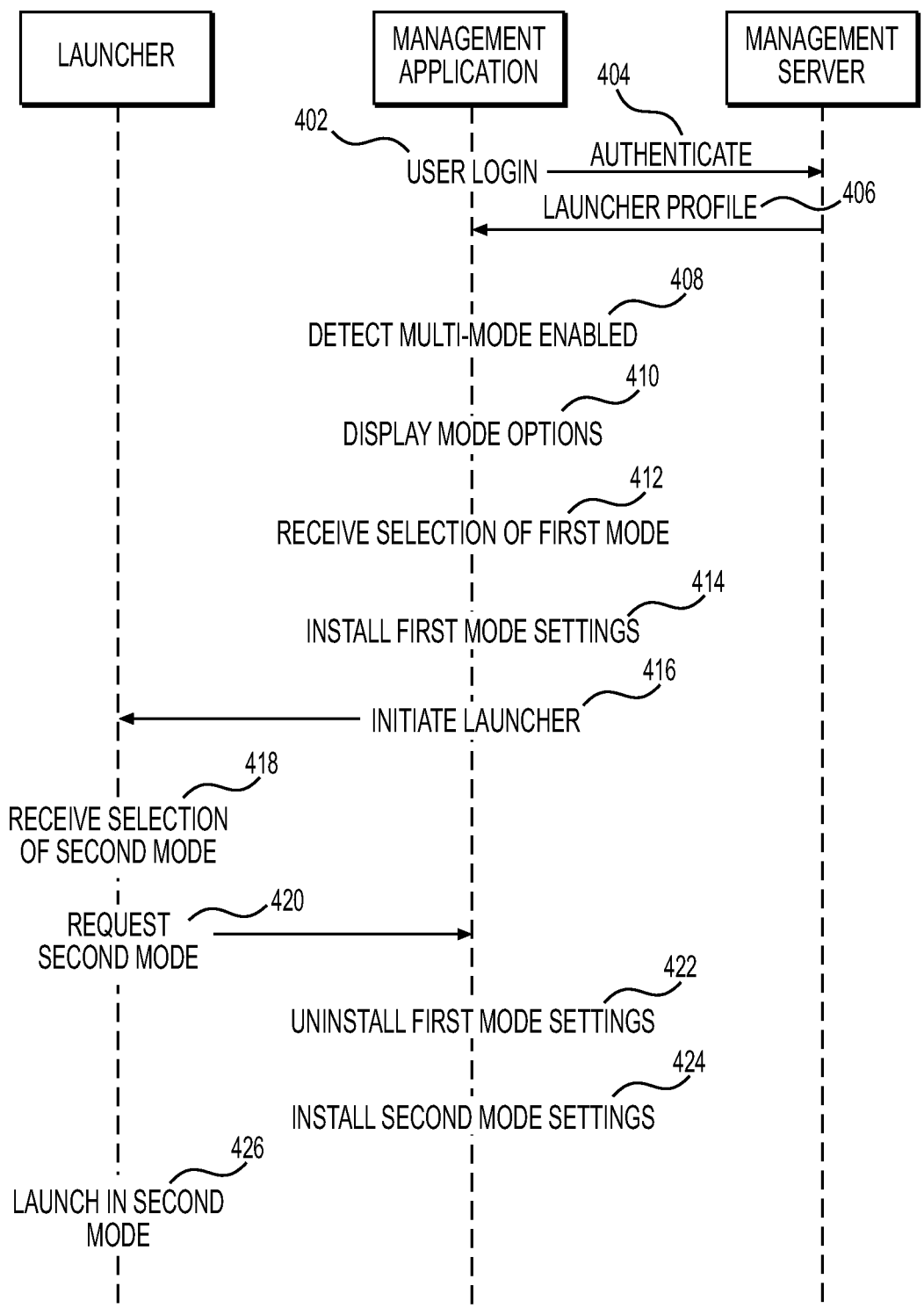
FIG. 4 is a sequence diagram of an example method for providing multiple modes in a launcher.

FIG. 4 is a sequence diagram of an example method for providing multiple modes in a launcher. The example method describes where a user can choose a launcher mode and switch launcher modes. At stage 402, a user can log in to the management application 112. For example, the user can boot up the user device 110 or turn the user device's display on when no one is logged in, or another user can log out from the user device 110. When this happens, the management application 112 can display a login prompt, and the user can input login credentials, such as a username and password.

At stage 404, the management application 112 can authenticate the user with the management server 120. For example, the management application 112 can send the user credentials to the management server 120, and the management server 120 can verify the credentials. If the credentials are successfully verified, then at stage 406, the management server 120 can send the user's launcher profile 124 to the management application 112. The management service 122 can send the launcher profile 124 as one or more data files, such as a JSON file or XML file.

The launcher profile 124 can include launcher mode settings for all launcher modes available to the user. For exemplary purposes, the user's launcher profile 124 in this example includes the first mode settings 126 for a first launcher mode and second mode settings 128 for a second launcher mode. This is not meant to be limiting in any way. For example, a launcher profile can include launcher mode settings for any number of modes that a user is authorized to use, such as one or more than two.

At stage 408, the management application 112 can detect that the launcher profile 124 allows for the user to choose a launcher mode. For example, the launcher profile 124 can include a property field that indicates whether the user can choose a launcher mode, and the management application 112 can check this property field before installing any launcher mode settings.

At stage 410, the management application 112 can display launcher mode options in a GUI. For example, the management application 112 can display names of the first and second launcher modes as an ordered list where the names are GUI selection mechanisms. In one example, the management application 112 can configure the launcher 114 to display the available launcher mode names to the user, and the launcher 114 can display the options.

At stage 412, the user can select the first launcher mode. At stage 414, the management application 112 can install the first mode settings 126. Although the first launcher mode is installed, the second mode settings 128 can be retained in the memory 116 of the user device 110 in case the user switches launcher modes.

At stage 416, the management application 112 can initiate the launcher 114. The launcher 114 can initiate using the installed first mode settings 126. As an example, the first launcher mode can be a Single App mode that allows access to a particular application associated with one role the user has with an organization. The management application 112 can load the settings for the application and configure the launcher 114 so that the rest of the user device 110 is inaccessible.

At stage 418, the user can select to change to a second launcher mode. This can be an option provided in the launcher 114. The user can select an option for changing launcher modes, and the launcher 114 can display a list of modes that the user can switch to based on the launcher profile 124. In this example, the launcher 114 can display the name of the second launcher mode, which the user can select.

At stage 420, the launcher 114 can request the second launcher mode from the management application 112. At stage 422, the management application 112 can uninstall the first mode settings 126 and, at stage 424, the management application 112 can install the second mode settings 128. As an example, the second launcher mode can be a Multi-App mode that includes applications associated with a second role the user has with an organization. The management application 112 can load the settings for the applications and configure the launcher 114 so that the rest of the user device 110 is inaccessible. This can include restricting access to the application from the first launcher mode. The management application 112 can also uninstall the first mode settings and retain the first mode settings 126 in the memory 116 in case the user switches modes again.

At stage 426, the launcher 114 can launch in the second launch mode. For example, the launcher 114 can display icons corresponding to the applications loaded from the second mode settings 128.

The ability to select launcher modes and switch between launcher modes can be particularly useful to users with multiple roles in an organization. For example, instead of requiring the user to carry multiple user devices, the user can access launcher modes for each role by simply selecting the appropriate launcher mode from a menu. The settings for that launcher mode can be installed on the user device 110 so that the user can use the user device 110 in the corresponding role. To switch roles, the user can simply switch launcher modes.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for providing multiple modes for a launcher application running on a client device with a management application through which a device management system manages the client device, the launcher application configured to modify a design and features of an operating system running on the client device, the method comprising:
sending, by the management application to a management server of a device management system, a request for a launcher profile for a user of the client device, the request including login credentials for the user;
receiving, by the management application from the management server, in response to the request, the launcher profile, the launcher profile indicating a plurality of launcher modes that are available to the user and including settings for the plurality of launcher modes, the settings of each of the launcher modes designating one or more applications that are allowed to run in a foreground of the client device while the user is logged in with the launcher application in the launcher mode;
displaying, in a graphical user interface ("GUI") options for selecting one of the plurality of launcher modes;
receiving a selection of a first launcher mode of the plurality of launcher modes through the GUI;
installing the settings for the first launcher mode in the client device; and
operating the launcher application in the first launcher mode, and restricting the user's access to applications not designated by the settings for the first launcher mode while the user is logged in with the launcher application in the first launcher mode.

2. The method of claim 1, wherein the options for selecting one of the plurality of launch modes are presented based on the launcher profile indicating that a user associated with the launcher profile is authorized to choose a launcher mode.

3. The method of claim 1, further comprising:
receiving a selection for switching to a second launcher mode of the plurality of launcher modes;
uninstalling the settings for to the first launcher mode; and
installing settings for to the second launcher mode.

4. The method of claim 1, wherein the settings included in the launcher profile are based on launcher modes designated for the launcher profile by an administrator.

5. The method of claim 1, wherein:
the selection of the first launcher mode is received prior to receiving the login credentials and is received from an administrator,
the selection of the first launcher mode is indicated in the launcher profile, and
the settings for the first launcher mode are installed based on the indicated selection.

6. The method of claim 1, wherein the plurality of launcher modes include:
a single application mode that allows only a single application to run in the foreground,
a multi-application mode that allows applications that are whitelisted in the launcher profile, and
a template mode that allows a customized set of applications as designated by an administrator.

7. The method of claim 1, wherein the launcher application is allowed to run on the client device only in one launcher mode, and not allowed to concurrently run in two or more launcher modes.

8. A non-transitory, computer-readable medium containing instructions that, when executed by a hardware-based processor of a client device that has a management application running therein, through which a device management system manages the client device, causes the processor to perform stages for providing multiple modes for a launcher application, the launcher application configured to modify a design and features of an operating system running on the client device, the stages comprising:

sending, by the management application to a management server of a device management system, for a launcher profile for a user of the client device, the request including login credentials;

receiving, by the management application from the management server, in response to the request, the launcher profile for a user of the client device, the launcher profile indicating a plurality of launcher modes that are available to the user and including settings for the plurality of launcher modes, the settings of each of the launcher modes designating one or more applications that are allowed to run in a foreground of the client device while the user is logged in with the launcher application in the launcher mode;

presenting, in a graphical user interface ("GUI") options for selecting one of the plurality of launcher modes;

receiving a selection of a first launcher mode of the plurality of launcher modes through the GUI;

installing the settings for the first launcher mode in the client device; and operating the launcher application in the first launcher mode, and restricting the user's access to applications not designated by the settings for the first launcher mode while the user is logged in with the launcher application in the first launcher mode.

9. The non-transitory, computer-readable medium of claim 8, wherein the options for selecting one of the plurality of launch modes are presented based on the launcher profile indicating that a user associated with the login credentials is authorized to choose a launcher mode.

10. The non-transitory, computer-readable medium of claim 8, the stages further comprising:

receiving a selection for switching to a second launcher mode of the plurality of launcher modes;

uninstalling the settings for to the first launcher mode; and installing settings for to the second launcher mode.

11. The non-transitory, computer-readable medium of claim 8, wherein the settings included in the launcher profile are based on launcher modes designated for the launcher profile by an administrator.

12. The non-transitory, computer-readable medium of claim 8, wherein:

the selection of the first launcher mode is received prior to receiving the login credentials and is received from an administrator, the selection of the first launcher mode is indicated in the launcher profile, and the settings for the first launcher mode are installed based on the indicated selection.

13. The non-transitory, computer-readable medium of claim 8, wherein the plurality of launcher modes include:

a single application mode that allows only a single application to run in the foreground, a multi-application mode that allows applications that are whitelisted in the launcher profile, and a template mode that allows a customized set of applications as designated by an administrator.

14. A system for providing multiple modes for a launcher application configured to modify a design and features of an operating system running on the system, comprising:

a memory storage including a non-transitory, computer-readable medium comprising instructions; and a hardware-based processor of a client device that has a management application running therein, through which a device management system manages the client device, wherein the hardware-based processor executes the instructions to carry out stages comprising:

sending, by the management application to a management server of a device management system, a request for a launcher profile for a user of the client device, the request including login credentials;

receiving, by the management application from the management server, in response to the request, the launcher profile for a user of the client device, the launcher profile indicating a plurality of launcher modes that are available to the user and including settings for the plurality of launcher modes, the settings of each of the launcher modes designating one or more applications that are allowed to run in a foreground of the client device while the user is logged in with the launcher application in the launcher mode;

presenting, in a graphical user interface ("GUI") options for selecting one of the plurality of launcher modes;

receiving a selection of a first launcher mode of the plurality of launcher modes through the GUI;

installing the settings for the first launcher mode in the client device; and operating the launcher application in the first launcher mode, and restricting the user's access to applications not designated by the settings for the first launcher mode while the user is logged in with the launcher application in the first launcher mode.

15. The system of claim 14, wherein the options for selecting one of the plurality of launch modes are presented based on the launcher profile indicating that a user associated with the login credentials is authorized to choose a launcher mode.

16. The system of claim 14, the stages further comprising:

receiving a selection for switching to a second launcher mode of the plurality of launcher modes;

uninstalling the settings for to the first launcher mode; and installing settings for to the second launcher mode.

17. The non-transitory, computer-readable medium of claim 8, wherein the launcher application is allowed to run on the client device only in one launcher mode, and not allowed to concurrently run in two or more launcher modes.

18. The system of claim 14, wherein the settings included in the launcher profile are based on launcher modes designated for the launcher profile by an administrator.

19. The system of claim 14, wherein:

the selection of the first launcher mode is received prior to receiving the login credentials and is received from an administrator, the selection of the first launcher mode is indicated in the launcher profile, and the settings for the first launcher mode are installed based on the indicated selection.

20. The system of claim 14, wherein the launcher application is allowed to run on the client device only in one launcher mode, and not allowed to concurrently run in two or more launcher modes.

* * * * *